United States Patent Office 2,730,283
Patented Jan. 10, 1956

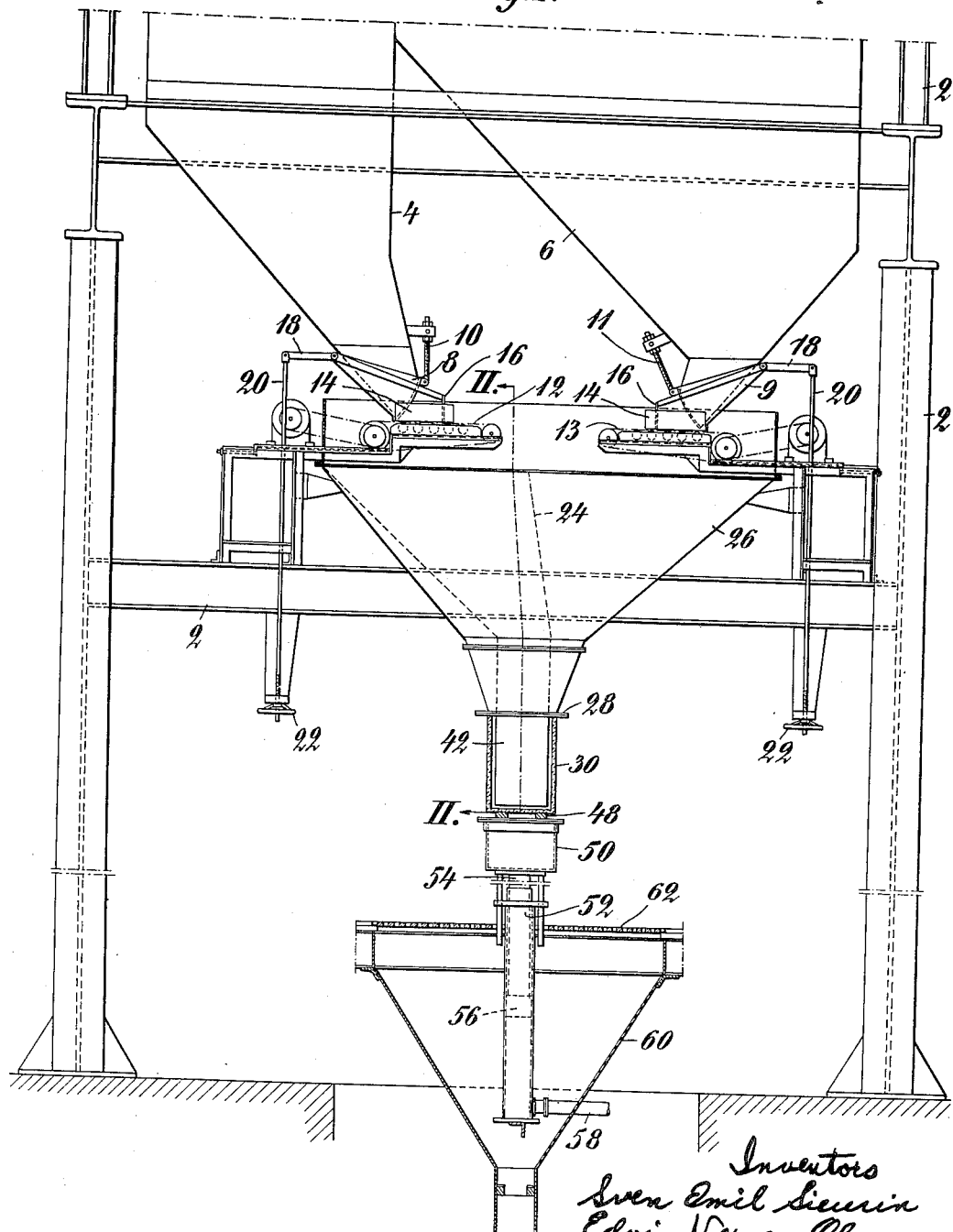

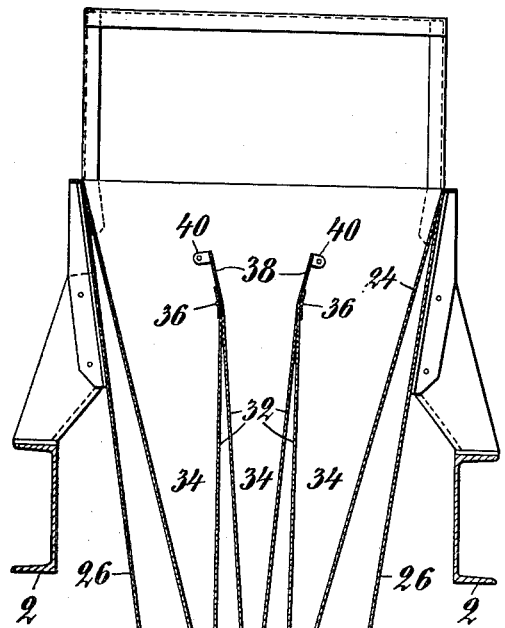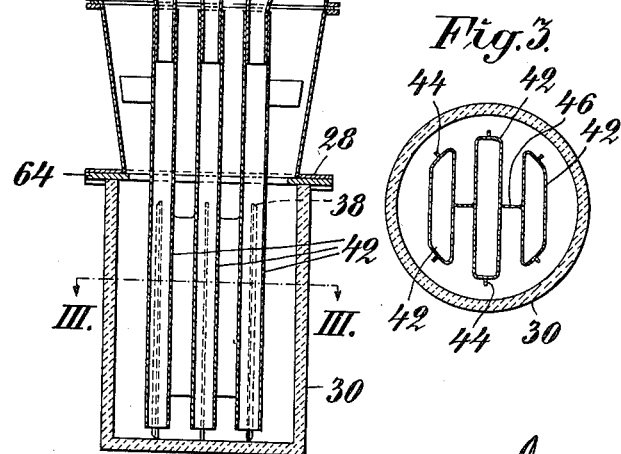

2,730,283

CHARGING REDUCTION CONTAINERS FOR THE PRODUCTION OF SPONGE METALS

Sven Emil Sieurin, Gamlegard, Forslovsholm, and Edvin Verner Olsson, Hoganas, Sweden, assignors to Hoganas-Billesholms Aktiebolag, Hoganas, Sweden, a corporation of Sweden Application February 20, 1948, Serial No. 9,848

Claims priority, application Sweden May 11, 1946

11 Claims. (Cl. 226—72)

This invention relates broadly to the reduction of ores and oxides of metals and more particularly to the reduction of these raw materials to produce sponge metals. The invention relates especially to a method of the type under consideration according to which the ores and oxides of the metals and reducing agent are arranged in layers in ceramic containers which after the charging operation are heated to the reducing temperature, for instance according to the Höganäs process.

According to this process and other methods of the same kind it has hitherto been customary to charge the container with the different materials in substantially horizontal layers. The sponge metal produced, however, has not been of desired uniform quality.

As in some cases for special purposes it is of great importance to have access to an even and highly reduced sponge metal there have been several investigations with the aim to improve the methods for producing sponge metal. It has thereby been discovered that the above mentioned drawback can be reduced or eliminated if the layers of metal ores or oxides are made with equal thickness all over the layer. For obtaining such layers it has been proposed to mix the ore or metal oxide with a binder and mold it to briquettes of different form. It has also been suggested to mix the reducing agent with a binder and mold it in the form of a container which surrounds a cavity with straight walls and thereafter charge the container with metal ore or oxide, which thereby forms a layer with equal thickness. The addition of a binder and the forming of the metal ore or oxide and the reducing agent, however, are connected with considerable costs for the binding agent and the forming and mixing operations which are hardly compensated by the advantages to be gained by using such methods.

The main purpose of the present invention is to create a more simple and less expensive method of charging the ceramic containers used in the process known by those skilled in the art under the name of the Höganäs process so that the sponge metal produced will be of quite satisfying and uniform quality. According to the Höganäs process the reduction is carried out in cylindrical ceramic containers which stacked upon one another in a kiln or a furnace are heated to a reduction temperature. Previous to the stacking the containers are charged with metal ores or oxides in horizontal layers embedded in the reducing agent. The metal ore or oxide is thus in free flowing pulverous form, such as ore concentrate, and the reducing agent also is in pulverous form preferably somewhat coarser than the metal oxide or ore. When charging the metal ore it is, however, difficult to obtain layers with substantially equal thickness as underlying layers are disturbed when charging an overlying layer and when the charge is packed or stamped to prevent further disturbance at the handling and stacking of the container in the furnace.

In contradiction to the above described normal charging the containers according to this invention are charged in such a way that the layers of metal ore or oxide will be substantially vertical and embedded in the reducing agent still in their free flowing form without any addition of binding agent. Preferably the layers are given a form with plane or convex surfaces to facilitate the removal of ash and reducing agent attached to the pieces of sponge metal obtained when the reduction is completed.

The charging of the containers is preferably carried out in such a way that sockets of sheet-metal in a shape corresponding to the form of the ore layers are introduced vertically into the container with their lower ends spaced from the bottom of the container whereupon the reducing agent is fed into the container outside the sockets, the container preferably being vibrated to cause the reducing agent to cover the bottom of the container even below the lower ends of the sockets. Then the metal ore or oxide is introduced into the sockets and these are removed from the container either concurrently with the rising of the ore level within them or after they are filled to the required extent with the material to be reduced. When the sockets are removed the top ends of the vertical layers are covered with a horizontal layer of reducing agent so that the layers of material to be reduced are completely embedded in the reducing agent. The charged containers are then as usual stacked in a furnace or kiln and heated to reduction temperature for an appropriate period of time.

When the reduction is completed the containers are emptied and the lumps of sponge metal separated from the ash and the unburned reducing agent in known manner, the lumps of sponge metal then being further cleaned in a rotating cleaning drum. Because of the straight or convex surfaces of the sponge metal lumps, adhering impurities including ash and reducing agent are readily removed therefrom.

According to the invention it is possible to obtain layers of the material to be reduced with the desired form described above without introducing any binding agent with accompanying mixing and forming operations. This is due to the fact that the layers during the forming are limited by the sockets and, when formed and the sockets removed, are limited by the surrounding reducing agent. This limiting action can be supported by vibrating the container and its content during the charging and before removing the sockets. Thus the content is packed and attains a higher density so that the layers of metal ore or oxide are better supported by the surrounding reducing agent and at the same time they have become so packed that their need for support in order to maintain the desired form is minimized.

However, the invention also contemplates an apparatus for carrying out the above described method for charging the reduction containers. This apparatus is highly effective in reducing the hand-work and the time required for charging the containers so that the charging costs are considerably reduced in relation to the same costs when charging the containers with horizontal layers according to the older methods. Thus, when using the method and apparatus according to the invention it is possible to obtain quite as good results as with the previous methods involving the use of a binding agent and forming the charge as briquettes or the like and this at a decreased cost which is substantially the same as when using horizontal layers of free flowing components or even still lower.

For a more detailed description of the apparatus according to the invention reference may be had to the drawings, in which Fig. 1 is a central vertical section through one embodiment of the apparatus, Fig. 2 is a vertical section on an enlarged scale of a part of the apparatus on the line II—II of Fig. 1, and Fig. 3 is a horizontal section of the reduction container with the sockets of the charging apparatus on the line III—III of Fig. 2.

Referring to the drawings the apparatus is built up of a structure 2 of iron beams which supports a storage bin 4 for metal oxide or ore and a storage bin 6 for reducing agent. Each bin 4 and 6 are at their lower ends provided with a sector door 8 and 9 respectively with regulation means 10 and 11 for the controlling of the flow of material from the bins. Beneath each bin 4 and 6 there is provided a conveying belt 12 and 13 respectively. The material flows onto the belts from the sector doors 8, 9. The flow of material is restricted sideways by means of guiding plates 14. The thickness of the layer of material on the belt is equalized by means of an adjustable scraper 16, which is operated with the lever 18 over the rod 20 from the hand wheel 22. The belts are as usual provided with bearing and end rollers and are driven by means of a chain.

Below the feeding means 8, 9, 12, 13 there is an outer hopper 26 and an inner hopper 24 arranged within the outer hopper. The outer hopper 26 terminates with a flange 28 fitting against the opening of a ceramic container 30. The inner hopper 24 is by means of partition walls 32 divided in three compartments 34. At the upper end the partition walls are combined two and two to form an edge at which there is provided a hinge 36 and a swingable plate 38 with a projecting lug 40 by means of which the plate 38 may be connected to adjusting and fastening means, not shown, for adjusting the width of the inlet openings to the compartments 34. Each compartment 34 terminates in a socket 42 with parallel walls. These sockets project below the flange 28 of the outer hopper to such an extent that when the flange abuts the opening of the container 30 the lower ends of the sockets will be spaced from the bottom of the container. For the purpose of strengthening the sockets against lateral movement they are provided with flanges 44 and interconnections 46.

The container 30 rests on a supporting ring 48 under which is arranged a casing 50 for an electric vibrator or the like. The casing 50 is supported by hydraulic jack 52 with a stem 54, a plunger 56 and an inlet and outlet tube 58 for the working medium. This jack 52 is arranged in a structure comprising a funnel 60 for collecting waste and a grate 62 through which superfluous material may fall down into the funnel 60.

The operation of the apparatus is as follows:

Before the beginning of the operation the bins 4 and 6 are charged with the materials for the reducing container 30, viz. the bin 4 with metal ore or oxide in free flowing granular form and the bin 6 with reducing agent also in free flowing form. The sector doors 8, 9 are operated to allow the materials to flow out of the bins at a predetermined rate. An empty container 30 to be charged is conveyed to the apparatus by means of a conveyer, for instance a rolling bed, and placed on the supporting ring 48 which at this time is in its lowered position. The container is then moved upwardly by means of the hydraulic jack 52 so that the sockets 42 abut the flange 28 which on its lower face is provided with a layer 64 of rubber or another resilient material to protect the rather fragile rim of the container from damage.

As soon as the rim of the container is firmly pressed against the rubber-layer 64 the conveying belt 13 under the bin 6 is started, whereby the reducing agent is fed into the hopper 26 and therefrom is guided downwardly into the space in the container outside the sockets 42. The container is vibrated with a vibrator, not shown, in the casing 50 so that the reducing agent covers the bottom of the container also beneath the ends of the sockets. As soon as the bottom is covered the metal ore or oxide can be charged by starting the conveying belt 12 below the bin 4. The flow of material to be reduced is divided into three parts by the partition walls 32. When the plates 38 are correctly adjusted these walls are arranged to divide the flow of material so that when the conveying belt is stopped the material fills the sockets in the container to the same level somewhat below the rim of the container 30. The charging of the reducing agent is continued during the charging of the ore and preferably also the vibrating of the container. When the container is filled it is lowered by means of the hydraulic jack until it is free of the projecting lower ends of the flanges 44 and moved away, whereby at the same time reducing agent is brought to cover the upper ends of the vertical layers thus formed.

The different steps in the charging operation, namely elevating the container 30, starting the conveying belt 13 for reducing agent, starting the vibrator, starting the conveying belt 12 for ore, stopping the belt 13 for reducing agent and for ore 12, stopping the vibrator and lowering the charged container may be controlled automatically by means of electrical relays, so that the operator only has to start the process, whereupon the different steps are timed without any manual operation.

The method of operation herein disclosed forms the subject matter of our copending divisional application Serial No. 438,752, filed June 21, 1954.

What is claimed is:

1. Apparatus of the character described for filling a container with different materials in free flowing particle state comprising an outer hopper having an outlet dimensioned to fit the rim defining the open top of a container and an inner hopper within said outer hopper, said inner hopper providing a plurality of laterally spaced apart feeding channels extending beyond the opening in said outer hopper and dimensioned to terminate short of the bottom of the container when the latter is positioned in contact with the rim of the outlet opening of the outer hopper; and means for selectively feeding different materials to the different hoppers.

2. Apparatus as set forth in claim 1 including means for mounting said hoppers and said container to have relative vertical movement with respect to each other to permit said feeding channels to be inserted in and removed vertically from the container.

3. Apparatus as set forth in claim 1 including vibrating means associated with said container for vibrating the same during the filling thereof from said hoppers.

4. Apparatus as set forth in claim 1 including adjustable means for varying the areas of the inlet openings of the feeding channels of said inner hopper.

5. Apparatus as set forth in claim 1 including storage bins associated respectively with each of said hoppers and adjustable feeding means for controlling the rate of feed of materials separately to each of said hoppers from its associated storage bin.

6. Apparatus for filling containers comprising a first hopper having an inlet and an outlet, said outlet being of a size to fit the open top of a container to be filled, a second hopper within said first hopper having an inlet spaced from the inlet of said first hopper and an outlet including laterally spaced apart channels extending beyond the outlet of said first hopper and adapted to extend substantially to the bottom of the container, and means to feed different materials to each of said hoppers so that when said container is removed from said channels the different materials will occupy different parts of said container.

7. Apparatus for filling a container having a wide opening defined by a top rim comprising a first hopper having an inlet and an outlet, said outlet having an attachment rim of a size to fit said top rim of the container, a second hopper within said first hopper having an inlet spaced from the inlet of said first hopper and an outlet in the form of spaced apart laterally closed channels extending beyond said attachment rim for a distance somewhat less than the depth of said container, said channels being spaced laterally from said rims, and means to feed different materials to each of said hoppers so that when said container is removed from said channels the different materials will occupy different parts of said container.

8. Apparatus for filling a container having a wide open mouth with different materials in free flowing particle form comprising a first hopper for receiving a first material and having a plurality of depending laterally spaced apart discharge channels communicating with the interior of the hopper, a second hopper for receiving a second material and having a discharge opening encompassing said discharge channels in laterally spaced relation therefrom and located at a level substantially above a level of the outlet openings of said discharge channels, the interior of said second hopper being in communication through the discharge opening thereof with the spaces between said discharge channels and with the space encompassing said channels, means for supporting a container to be filled with its mouth substantially in registry with the discharge opening of said second hopper and with the outlets of said discharge channels adjacent to but spaced from the bottom of the container, means for feeding a controlled amount of said second material to said container to fill therewith to desired level the space below and around said channels, means for feeding a controlled amount of said first material to fill said channels to desired level, and means for moving said container relative to said channels to cause the removal of the channels from the container and deposit of said first material in the spaces vacated by the channels.

9. Apparatus as defined in claim 8 including means for vibrating said container while it is supported in a position to be filled, whereby to pack said second material in the spaces around said discharge channels before the latter are withdrawn from the container.

10. Apparatus as defined in claim 8 in which said discharge channels are shaped in cross section relative to the cross sectional area of the container so that the container is filled with spaced apart substantially parallel panels or laminates of said first material each surrounded by said second material after the said materials have been fed into the container and the discharge channels removed therefrom.

11. In an apparatus for reducing a pulverulent ore with a pulverulent reducing agent, a first feeding device adapted to supply a predetermined quantity of a pulverulent ore, a second feeding device adapted to supply a predetermined quantity of a pulverulent reducing agent, a container of ceramic material adapted to receive the ore to be reduced and the reducing agent, said container having a bottom, a substantially cylindrical wall and a top rim, a distributing device between said feeding devices and the container comprising an outer hopper adapted to distribute the pulverulent reducing agent and having an outlet provided with an attachment rim of a size to fit the top rim of said container, an inner hopper adapted to distribute the pulverulent ore, at least one filling conduit for the ore, said filling conduit being secured at one end to the bottom of the inner hopper and extending downwardly beyond the attachment rim of said outer hopper for a distance of somewhat less than the depth of said container and being spaced apart laterally from the wall of said outer hopper and from the walls of said container, said distributing device being situated in such a position under said feeding devices that the pulverulent materials are fed by gravity from said feeding devices through the distributing device into the container, means for vibrating said container, means for lifting a container to bring its top rim in contact with the attachment rim of said outer hopper and means for lowering said container while receiving said materials, whereby the filled container will contain at least one vertical layer of ore, surrounded by reducing agent.

References Cited in the file of this patent

UNITED STATES PATENTS

| | | |
|---|---|---|
| 105,267 | Smith | July 12, 1870 |
| 682,243 | Cuscaden et al. | Sept. 10, 1901 |
| 952,146 | Schilling | Mar. 15, 1910 |
| 1,002,018 | Wright | Aug. 29, 1911 |
| 1,054,873 | Sieurin | Mar. 4, 1913 |
| 1,629,968 | Richards | May 24, 1927 |
| 1,748,111 | Cornell et al. | Feb. 25, 1930 |
| 1,920,605 | Steward | Aug. 1, 1933 |
| 1,947,441 | Bacharach | Feb. 20, 1934 |
| 1,951,694 | Goulstone | Mar. 20, 1934 |
| 2,029,307 | Campbell | Feb. 4, 1936 |
| 2,344,901 | Routh | Mar. 21, 1944 |
| 2,458,228 | Vredenburg | Jan. 4, 1949 |